(12) United States Patent
Carver

(10) Patent No.: US 12,743,327 B2
(45) Date of Patent: Sep. 22, 2026

(54) METHODS, MEDIUMS, AND SYSTEMS FOR PROVIDING A NOTIFICATIONS ARCHITECTURE

(71) Applicant: Waters Technologies Ireland Limited, Dublin (IE)

(72) Inventor: Christopher Carver, Northwich (GB)

(73) Assignee: Waters Technologies Ireland Limited, Dublin (IE)

( * ) Notice: Subject to any disclaimer, the term of this patent is extended or adjusted under 35 U.S.C. 154(b) by 919 days.

(21) Appl. No.: 18/156,045

(22) Filed: Jan. 18, 2023

(65) Prior Publication Data

US 2023/0229531 A1 Jul. 20, 2023

Related U.S. Application Data

(60) Provisional application No. 63/300,403, filed on Jan. 18, 2022.

(51) Int. Cl.
*G06F 9/54* (2006.01)

(52) U.S. Cl.
CPC .................................... *G06F 9/542* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS 10,897,645 B2 * 1/2021 Shoop .............. H04N 21/44231
2014/0032694 A1 * 1/2014 Cohn ..................... G06Q 10/10
709/207

FOREIGN PATENT DOCUMENTS

EP 3831282 A1 6/2021

OTHER PUBLICATIONS

International Search Report and Written Opinion for International Patent Application No. PCT/IB2023/050431, mailed Mar. 30, 2023.
International Preliminary Report on Patentability for International Patent Application No. PCT/IB2023/050431, mailed Aug. 2, 2024.

* cited by examiner

*Primary Examiner* — Andy Ho
(74) *Attorney, Agent, or Firm* — Goodwin Procter LLP

(57) ABSTRACT

Exemplary embodiments provides computer-implemented methods, mediums, and apparatuses that provide an architecture for supporting event notifications in an analytical chemistry system. The notifications architecture allows notifications to be sent within and outside the analytical chemistry system. It supports notifications provided by disparate devices and applications of the analytical chemistry system and allows the notifications to be sent on a variety of different delivery channels in a unified and consistent way. The architecture is easily extensible to support new types of notifications and new delivery channels. The architecture supports stateful notifications, allowing the read/unread status of the notifications to be displayed. Furthermore, the architecture can leverage existing events to generate notifications, which allows events to serve multiple purposes in the analytical chemistry system and therefore reducing the amount of messages and processing that needs to be done in the system.

17 Claims, 9 Drawing Sheets

START 714

RETRIEVE NEXT NOTIFICATION 716

GET EVENT SUBSCRIBERS 718

FORMAT NOTIFICATION 720

TRANSMIT ON SUBSCRIPTION CHANNELS 722

METHODS, MEDIUMS, AND SYSTEMS FOR PROVIDING A NOTIFICATIONS ARCHITECTURE

CROSS-REFERENCE TO RELATED APPLICATIONS

This application claims the benefit of and priority to U.S. Provisional Patent Application No. 63/300,403, filed Jan. 18, 2022. The entire disclosure of which is hereby incorporated by reference.

BACKGROUND

Laboratory analytical instruments are devices for qualitatively and/or quantitatively analyzing samples. They are often used in a laboratory setting for scientific research or testing. Such devices may measure the chemical makeup of a sample, the quantity of components in a sample, and perform similar analyses. Examples include mass spectrometers, chromatographs, titrators, spectrometers, elemental analyzers, particle size analyzers, rheometers, thermal analyzers, etc.

Laboratory analytical instruments may be used in an analytical chemistry system, which may include one or more laboratory analytical instruments and/or other types of devices. The data generated on these devices may be analyzed by analysis devices and/or software, which may be operated locally or in the cloud. Data analysis in analytical chemistry environments may be quite complex and time-consuming. Some users may wish to switch back-and-forth between different analysis applications, performing certain tasks while others are processing. Moreover, some tasks may take a long time to complete, during which an analyst may leave a workstation.

Problematically, as a user moves between different applications or moves away from the workstation, events can occur that require the user's immediate attention. For example, an application may make a change in backend data that a user should be informed of. Similarly, if an asynchronous operation is executed in an application (which encompasses many cloud-based operations) and fails, a user may wish to be informed (even if the user moves to a different application in the meantime. Still further, certain audit entries may appear in the system from time-to-time, and a user may wish to be notified of these entries.

Unfortunately, there are many disparate applications and analysis devices that are used in analytical chemistry environments. Different applications may not be capable of communicating with each other, and therefore may have no ability to send notifications between themselves. Even if one application is capable of sending a notification to another, there is generally no consistent way to display these notifications across the analytical chemistry environment. Thus, a user may discount notifications displayed in one application because they do not appear in a format that the user recognizes.

BRIEF SUMMARY

Exemplary embodiments provide tunneling and pipelines between different applications and devices in an analytical chemistry system, allowing notifications to be delivered in a timely and consistent manner across many different delivery channels.

Exemplary embodiments may include computer-implemented methods, as well as non-transitory computer-readable mediums storing instructions for performing the methods, apparatuses configured to perform the methods, etc.

According to a first embodiment, a data ecosystem for an analytical chemistry system may be accessed. An event bridge in the data ecosystem may receive an event from an application connected to the data ecosystem. A notification of the event may be generated and transmitted across a plurality of different delivery channels to a user who has subscribed to receive a notification of the event.

The event bridge may be responsible for receiving notification events from device autonomous services. The notification event may be added to a cloud-based user notification queuing service. A notifications autonomous service may retrieve the notification events and transmit them to subscribed applications within the analytical chemistry system and/or outbound services outside the analytical chemistry system (e.g., SMS, email, etc.). The different delivery channels may subscribe to the notifications service to receive the notification events from the notifications autonomous service.

Notifications may include any information that a device or application is configured to draw a user's attention to. Such information could come from (for example): entries of interest in audit logs (such as notifying an administrator of a failed login attempt); an application's completion of a long-running asynchronous operation; an application's errors or warnings associated with asynchronous operations; a laboratory analytical instrument's acquisition events (e.g., inject/batch completion); file upload and automatic conversion extract, transform, load (ETL) statuses; and operations related to an analytical chemistry workflow (e.g., the acquisition of signatures causing the workflow to move from one stage to another).

With this architecture, notifications can be generated by devices in the analytical chemistry system and/or applications in the data ecosystem and fanned out to a wide variety of delivery channels. They can be delivered and displayed in a consistent way across the delivery channels. Certain architectural features contribute to these and other advantages:

- Multiple different channels can deliver notifications out to a subscribing user. This increases the chance that a user will receive a notification and be able to act on it in a timely manner.
- Because the notifications service is event-driven, the different aspects of its operation can be decoupled and run as different services/data structures. This makes processing more efficient and reduces the risk of error. Moreover, the different components can be upgraded or replaced individually, without requiring significant downtime for the entire system.
- Any event generated by the platform or applications can be used as a notification. Furthermore, any event can have multiple uses, which adds to system efficiency and reduces the number of messages that need to be exchanged.
- The architecture is easily extensible. New users or applications can register to receive notifications, and new devices and applications can register to send notifications, without the need to rebuild the architecture.
- Notifications can be stateful. For certain channels, the system can track whether or not a notification has been read based on the notification's delivery status in a queue and/or whether a user has interacted with a particular application's UI or UI element.

According to a second embodiment, the event may be one or more of: a new audit log entry, a completion of an asynchronous operation, an error or a warning associated with the asynchronous operation, an acquisition event, a file upload, a file conversion, or a workflow-related operation.

In the context of an analytical chemistry system, these types of events are particularly important to be flagged to a user in a timely manner, and the described architecture is well-suited to delivering them.

According to a third embodiment, the plurality of different channels may include at least two of: a simple messaging service channel, an email channel, a web browser channel, and an application programming interface (API) channel.

The API channel can be used to transmit notifications to applications in a data ecosystem for an analytical chemistry system and the web browser channel can be used to display notifications on a system dashboard. Thus, if a user moves from one application to another in the system, the user can still be informed of the notification through the new application's interface (via the API channel) or through the dashboard (via the web browser channel). The remaining channels can be used to notify the user even when they are not currently in front of an application or dashboard for the system, as might be the case if the user steps away during a lengthy data processing session (or if the user is an administrator who needs to be notified of events even while off-duty).

According to a fourth embodiment, the application may be a first application and the event may be received at a time that a second application different from the first application is active.

Thus, the user can be notified of an event that occurs in any of multiple different data processing paradigms, through a single unified interface. This allows the user to move on to new tasks while still remaining confident that they will be informed of important data events that arise in applications that they are not currently focused on.

According to a fifth embodiment, a notification service may retrieve a copy of the event from a notifications queue in communication with the event bridge, transform the event into the notification, and transmit the notification on the plurality of channels.

Using the notification service aids extensibility (since new notification types or subscriptions can be easily added through a single service) and provides a central point of contact for notifications (which allows notifications to be handled in a uniform manner). Moreover, the notification service can be configured to transform the events into appropriate notification formats, depending on the destinations registered with the notification service. For instance, the notification service may store a number of templates to assist it in generating the notification. When transmitting a notification as an email (for example), the notification service may retrieve the appropriate email template and transform the content of the notification based on the template, sending the resulting email to any email subscribers.

Furthermore, not every event generated in the system needs to be sent as a notification on every possible delivery channel. Each event may include source information and type information. The notification service may be configured to receive the event, examine its source and type, and consult a list of subscribers to determine which subscribers are interested in receiving notifications related to the received event's source and type. Only channels relevant to those subscriptions need to be used to transmit the notification.

According to a sixth embodiment, an entry corresponding to the event may be added to an audit log maintained by the data ecosystem.

With this embodiment, events can be reviewed even after they are acknowledged and/or deleted by a user. This allows users or administrators to examine previous events after a problem occurs, to determine which events triggered notifications and which were acted upon in a timely manner.

According to a seventh embodiment, the event bridge may be in communication with one or more of a device service configured to generate events describing a state of a laboratory analytical instrument in the analytical chemistry system, a laboratory monitoring service configured to generate events in response to a creation, editing, or removal of a subscription in the data ecosystem, or a compliance service configured to generate events in response to a change in an assignment of a user of the data ecosystem to a team, or the assignment of one or more rights to the team. This architecture allows different types of events that are commonly pertinent to an analytical chemistry system to be recognized and acted upon.

Unless otherwise noted, it is contemplated that each embodiment may be used separately to achieve the advantages specifically identified above. It is also contemplated that the embodiments described above (and elsewhere herein) may be used in any combination to achieve further synergistic effects. Other technical features will be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
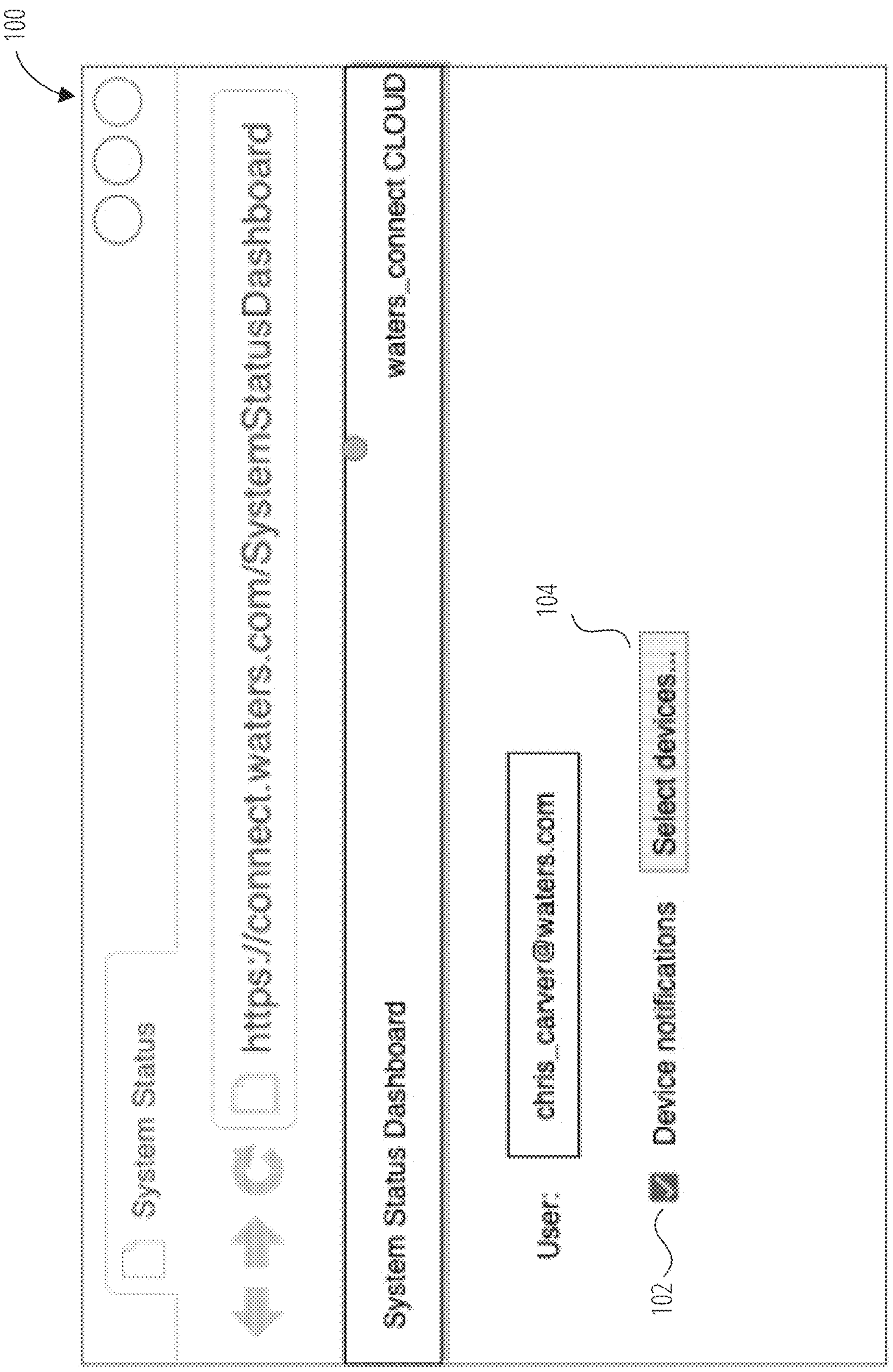
FIG. 1 illustrates an exemplary interface in accordance with one embodiment.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through **122-*a* may include components 122-1, 122-2, 122-3, 122-4, and 122-5**. The embodiments are not limited in this context.

These and other features will be described in more detail below with reference to the accompanying figures.

Any of the devices or applications in an analytical chemistry system may generate notifications to be displayed to users. For example, a laboratory analytical instrument may generate an event that triggers a notification when it completes data acquisition or when an error condition arises, or an application may generate events during or after data processing. The notifications may be sent to a variety of locations, such as an interface on a client browser 332 (see FIG. 3), a user email address or phone number (e.g., via SMS), etc.

Notifications may be sent to these various delivery channels based on a list of subscriptions. A subscription may define a list of devices, email addresses, phone numbers, or other forms of contact information to which notifications should be sent. The subscription may also define categories of events that the subscription applies to: when an event in the category is received, a notification may be generated and sent to the delivery channels.

FIG. 1 depicts an example of an interface for a system status dashboard 100, as might be displayed on the client browser 332 (or a suitable web page). The system status dashboard 100 may allow a user to create subscriptions for notifications.

To that end, the system status dashboard 100 may include a toggleable notifications element 102 that allows a user to turn notifications on or off for their user account (in this example, the user has identified their user account by entering their email address into a text field in the system status dashboard 100). The system status dashboard 100 may also include a notification device menu 104, which may allow the user to select or enter a list of devices that should be provided with notifications. The list may include a list of delivery mechanisms (phone numbers, email addresses, applications to which subscriptions should be sent, etc.).

The system status dashboard 100 may also allow the user to select which categories of notifications they would like to receive. For instance, the interface may provide an entry element that includes devices and applications to which the user has access. The user may be capable of selecting or de-selecting some of the devices/applications in order to receive notifications of events from any selected devices/applications. The system status dashboard 100 may also provide more granular options, such as allowing the user to subscribe only to particular types of events for a given device or application—for instance, the user could register to receive notifications of system errors or warnings for a particular device, but might not be interested in receiving notifications when that device completes data acquisition. In another example, the user might wish to receive a notification of the status of data processing by a particular application, but might not wish to receive notifications of file ETL operations.

Figure 2A:
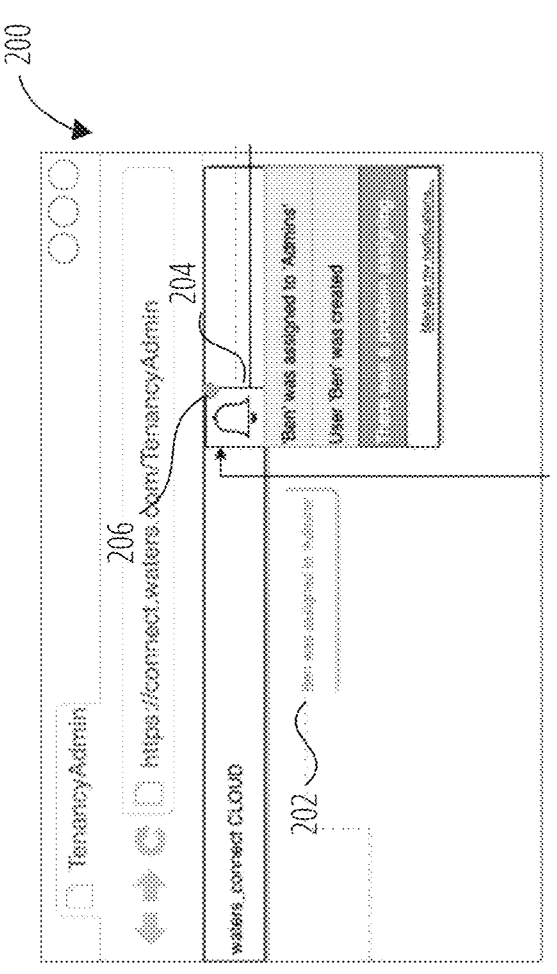
FIG. 2A illustrates an exemplary interface in accordance with one embodiment.

A subscription may apply to an individual user or to groups of users (e.g., organized into teams). When a team that is subscribed to receive notifications changes (e.g., in membership, in permissions, in the types of notifications it is subscribed to receive, etc.), the corresponding subscription may be updated. this update may trigger an event that itself may serve as the basis of a notification. FIG. 2A depicts an example of a tenancy administration interface 200 in which a team was recently updated by adding a new user "Ben."

The team may have been subscribed to receive notifications when the team (e.g., users registered through a tenancy) changes membership. To that end, while a user who is a member of the team (and therefore subscribed to receive the notifications) is logged into a tenancy administration interface 200, they may receive a notification 204 in the interface. The notification 204 may include descriptive text that describes the event that gave rise to the notification.

As discussed in more detail below, a notifications service may be responsible for formatting the notification and transmitting it to the tenancy administration interface 200 (e.g., through an API). The notification 204 may be displayed in a similar manner and in a similar format on different interfaces through the action of the notifications service. For example, the notifications service may be responsible for formatting the notifications provided to different communication channels in a similar way. Optionally, each application/webpage that supports notifications may implement a common shared control or micro-frontend, which allows for a consistent notifications experience across various applications.

In some cases, receiving a notification may trigger the list of notifications 204 to automatically display; alternatively, the list of notifications may remain hidden behind an icon, and the icon may be updated to indicate that a new notification is present. For example, the icon might change color, flash, an audible tone might be emitted, or the icon might display a badge 206, potentially including a count of unread notifications. Optionally, a notification may trigger a popup 202 in another part of the interface to inform the user that a new notification exists. The popup 202 may include the content of the notification and might persist for a predetermined limited amount of time, after which the notification may still be available by interacting with the icon to cause the list of notifications 204 to be displayed.

Figure 2B:
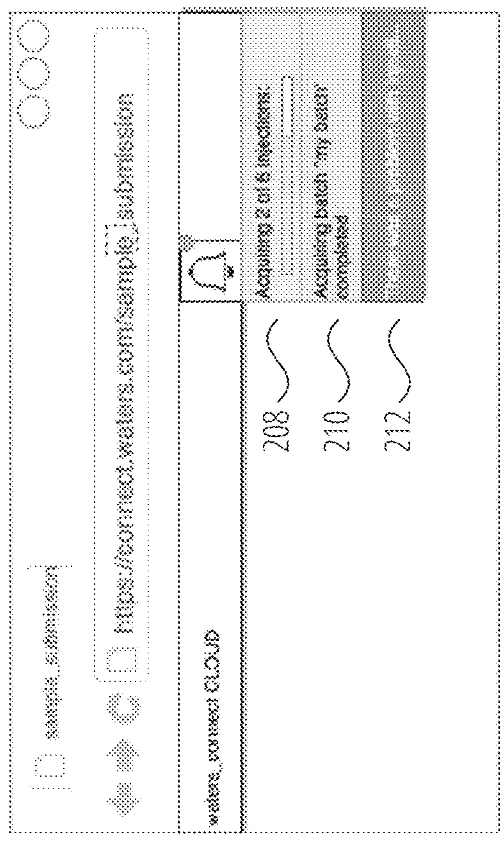
FIG. 2B illustrates an exemplary interface in accordance with one embodiment.

FIG. 2B depicts another example of a different type of notification—in this case, an ongoing process status 208. The ongoing process status 208 shows the status of data acquisitions by one of the laboratory analytical instruments in the analytical chemistry system. As new data acquisitions are completed by the instrument, an event may be triggered that causes the ongoing process status 208 to be updated. In this case, instead of generating a new notification in the window, an existing notification may be updated (e.g., by updating the number of data acquisitions completed and/or a progress bar).

This particular interface also shows an acquisition completion notification 210 indicating that a data acquisition for an instrument has been finished. Further, an instrument error notification 212 is shown, indicating that there is a problem with the instrument that should be addressed. The acquisition completion notification 210 and instrument error notification 212 may be displayed in different colors (from each other and/or from other types of notifications) so that a user can be quickly informed of particular types of notifications that may require more immediate attention or that signal more important events (e.g., the completion of a long-running process or a problem that needs to be resolved before data acquisition can continue). In general, different types or categories of notifications can be distinguished in a variety of ways (through background color, font changes, by triggering different audible tones, etc.).

Figure 3:
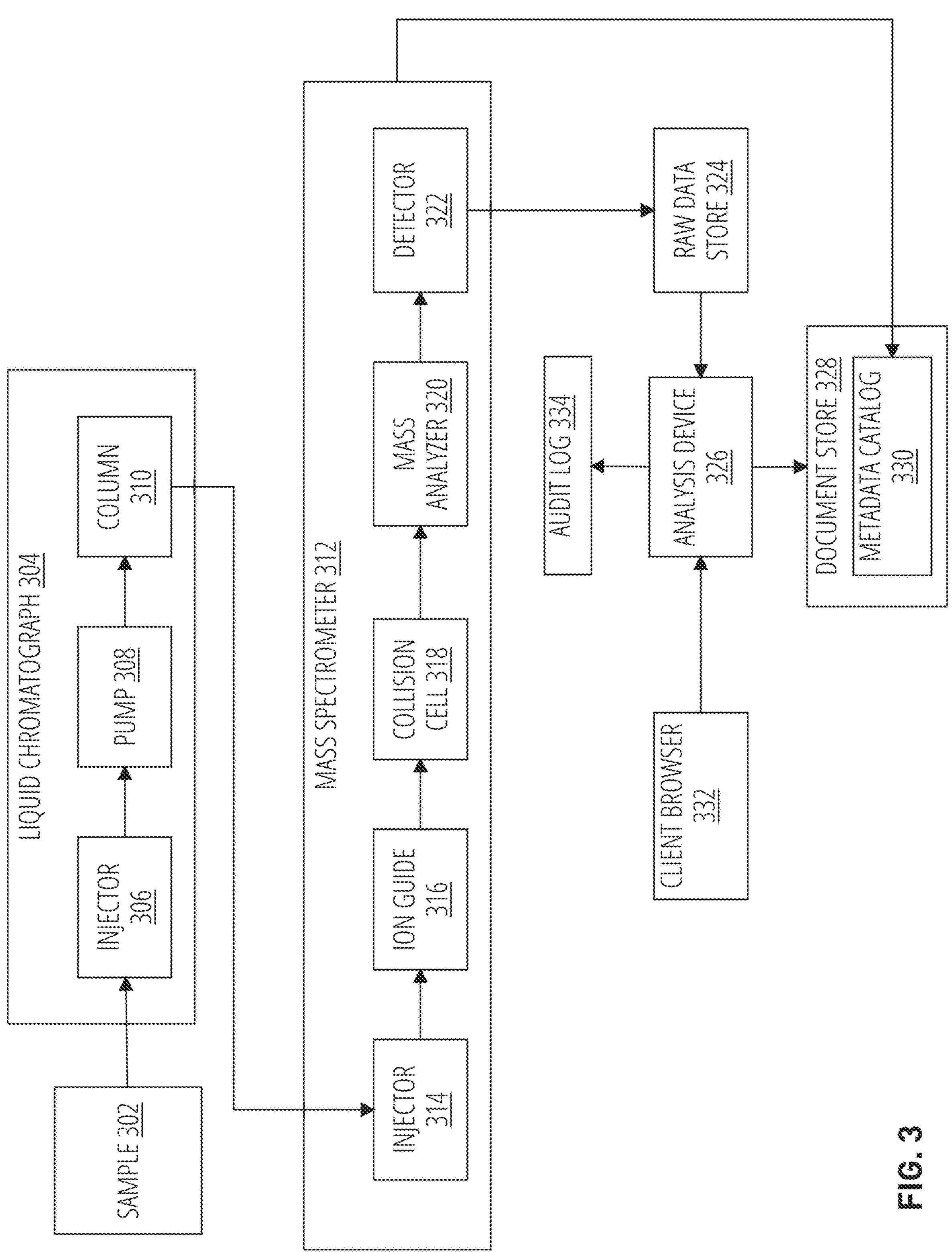
FIG. 3 illustrates an example of a mass spectrometry system according to an exemplary embodiment.

For purposes of illustration, FIG. 3 is a schematic diagram of an analytic chemistry system that may be used in connection with techniques herein. Although FIG. 3 depicts particular types of devices in a specific liquid chromatography/mass spectrometry (LCMS) configuration, one of ordinary skill in the art will understand that different types of chromatographic devices (e.g., MS, tandem MS, etc.) may also be used in connection with the present disclosure.

A sample 302 is injected into a liquid chromatograph 304 through an injector 306. A pump 308 pumps the sample through a column 310 to separate the mixture into component parts according to retention time through the column.

The output from the column is input to a mass spectrometer 312 for analysis. Initially, the sample is desolved and ionized by a desolvation/ionization device 314. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 318 by a voltage gradient being applied to an ion guide 316. Collision cell 318 can be used to pass the ions (low-energy) or to fragment the ions (high-energy).

Different techniques may be used in which an alternating voltage can be applied across the collision cell 318 to cause fragmentation. Spectra are collected for the precursors at low-energy (no collisions) and fragments at high-energy (results of collisions).

The output of collision cell 318 is input to a mass analyzer 320. Mass analyzer 320 can be any mass analyzer, including quadrupole, time-of-flight (TOF), ion trap, magnetic sector mass analyzers as well as combinations thereof. A detector 322 detects ions emanating from mass analyzer 322. Detector 322 can be integral with mass analyzer 320. For example, in the case of a TOF mass analyzer, detector 322 can be a microchannel plate detector that counts intensity of ions, i.e., counts numbers of ions impinging it.

A raw data store 324 may provide permanent storage for storing the ion counts for analysis. For example, raw data store 324 can be an internal or external computer data storage device such as a disk, flash-based storage, and the like. An analysis device 326 analyzes the stored data. Data can also be analyzed in real time without requiring storage in a storage medium 324. In real time analysis, detector 322 passes data to be analyzed directly to analysis device 326 without first storing it to permanent storage.

Collision cell 318 performs fragmentation of the precursor ions. Fragmentation can be used to determine the primary sequence of a peptide and subsequently lead to the identity of the originating protein. Collision cell 318 includes a gas such as helium, argon, nitrogen, air, or methane. When a charged precursor interacts with gas atoms, the resulting collisions can fragment the precursor by breaking it up into resulting fragment ions. Such fragmentation can be accomplished by switching the voltage in a collision cell between a low voltage state (e.g., low energy, <5 V) and a high voltage state (e.g., high or elevated energy, >15V). High and low voltage may be referred to as high and low energy, since a high or low voltage respectively is used to impart kinetic energy to an ion.

Various protocols can be used to determine when and how to switch the voltage for such an MS/MS acquisition. After data acquisition, the resulting spectra can be extracted from the raw data store 324 and displayed and processed by post-acquisition algorithms in the analysis device 326.

Metadata describing various parameters related to data acquisition may be generated alongside the raw data. This information may include a configuration of the liquid chromatograph 304 or mass spectrometer 312 (or other chromatography apparatus that acquires the data), which may define a data type. An identifier (e.g., a key) for a codec that is configured to decode the data may also be stored as part of the metadata and/or with the raw data. The metadata may be stored in a metadata catalog 330 in a document store 328.

The analysis device 326 may operate according to a workflow, providing visualizations of data to an analyst at each of the workflow steps and allowing the analyst to generate output data by performing processing specific to the workflow step. The workflow may be generated and retrieved via a client browser 332. As the analysis device 326 performs the steps of the workflow, it may read read raw data from a stream of data located in the raw data store 324. As the analysis device 326 performs the steps of the workflow, it may generate processed data that is stored in a metadata catalog 330 in a document store 328; alternatively or in addition, the processed data may be stored in a different location specified by a user of the analysis device 326. It may also generate audit records that may be stored in an audit log 334.

Figure 8:
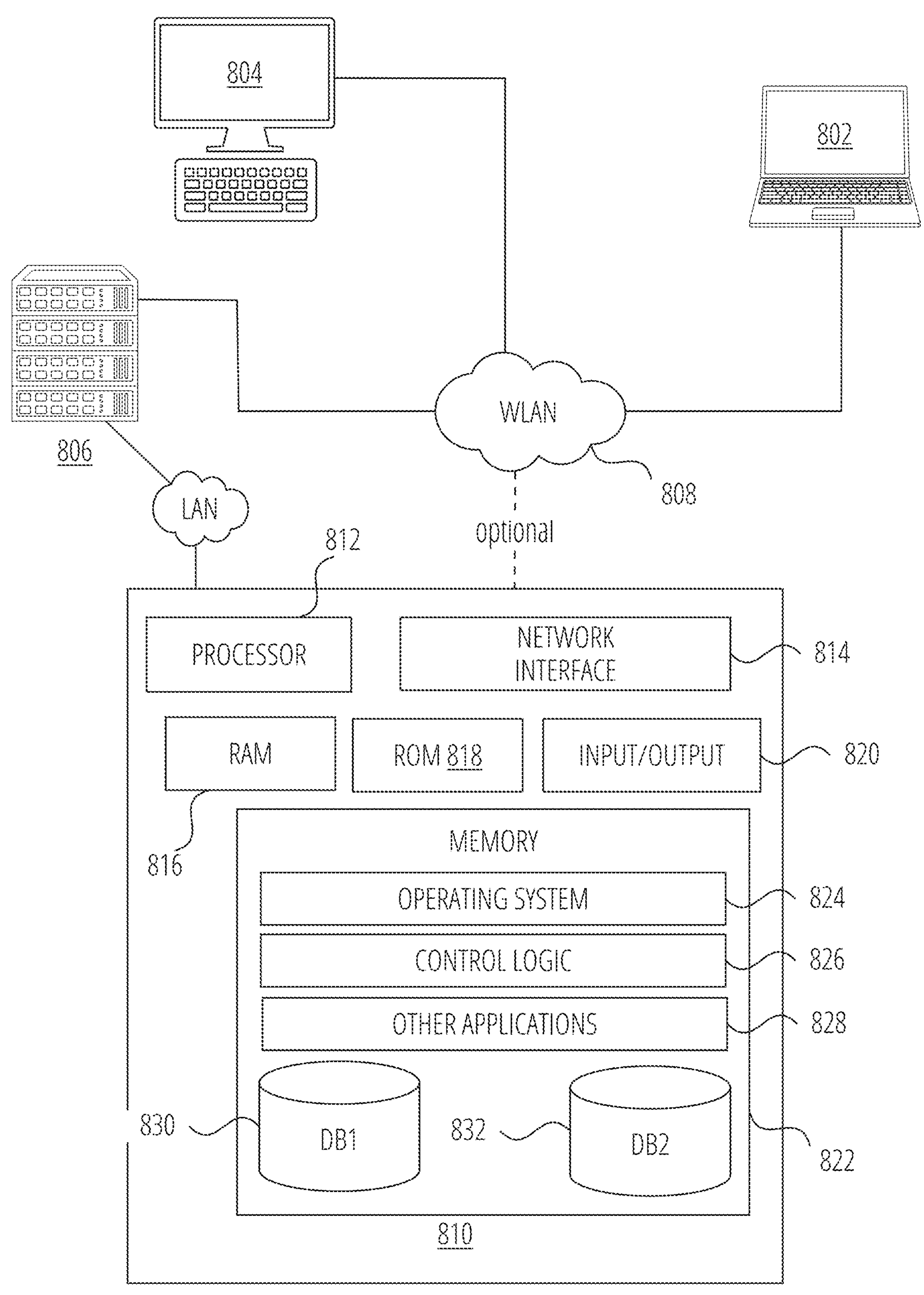
FIG. 8 depicts an illustrative computer system architecture that may be used to practice exemplary embodiments described herein.

The exemplary embodiments described herein may be performed at the client browser 332 and analysis device 326, among other locations. An example of a device suitable for use as an analysis device 326 and/or client browser 332, as well as various data storage devices, is depicted in FIG. 8.

Figure 4A:
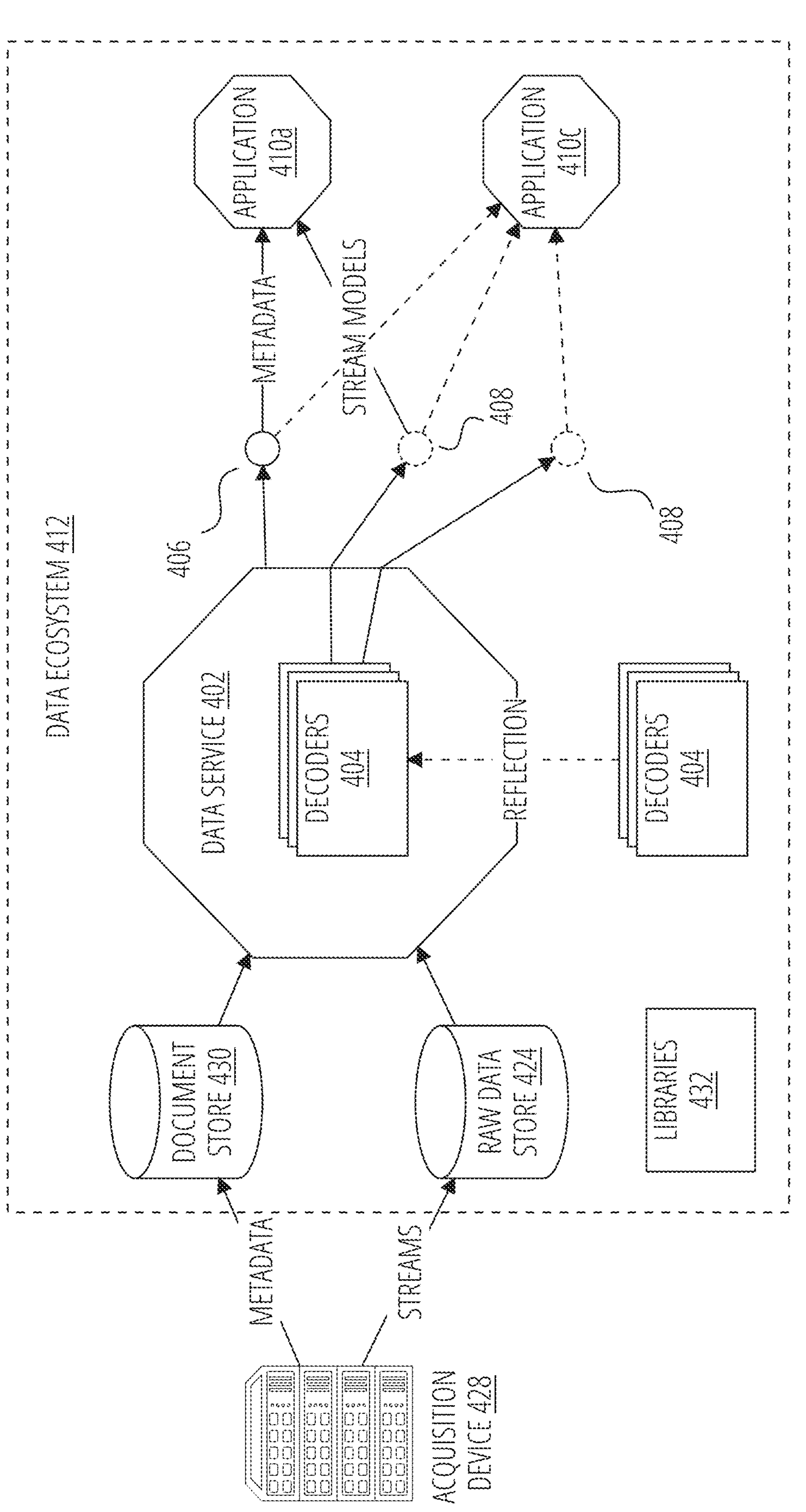
FIG. 4A illustrates a first exemplary data processing ecosystem in accordance with one embodiment.

FIG. 4A depicts an exemplary data ecosystem 412 for storing and retrieving chromatography data.

A chromatography acquisition 428, such as a spectrometer, chromatography, or other device, may perform and output measurements (e.g., as a stream of readings formatted according to a data type that is specific to the acquisition 428 and/or settings applied to the acquisition 428). Those measurements may be stored in a raw data store 424.

In one example, the acquisition 428 may acquire samples using an acquisition controller service. The acquisition controller service may submit the samples, via a RESTful API call, to an acquired data receiver autonomous service. The acquired data receiver autonomous service may create a sample set, which represents the multiple samples sent for analysis into an instrument. In other words, a sample set is an organized sequence of several injections that were sent into the chromatography apparatus.

The raw data raw data store 424 may include data from multiple different chromatography apparatuses and/or chromatography apparatuses operating in multiple different acquisition modes. Accordingly, the data processing environment acts as a single source of data for applications, regardless of which device generated the data (or which mode the data was operating in). Any application calling into the ecosystem can be sure that any acquired data can be accessed and processed appropriately.

The sample set may be stored in a sample set model store, while injection raw data blobs may be sent to a separate acquired data raw blob store. The data may generally be stored in an oracle database as one or more models, which may represent a serialized format for storing the data. The serialized format may be a proprietary format. The models can be streamed to various applications and/or requested via interface calls. One or more libraries 432 built into the data ecosystem 412 may be capable of reading the models and deserializing them by converting them into basic modules. The libraries 432 may be, for example, dynamically linked libraries (DLLs) for the data ecosystem 412. In addition to deserializing the models, the libraries 432 may also describe derived channels in the data by defining how to transform measured data into a different type, format, or organization of data.

The acquisition 428 may also generate metadata describing the configuration of the acquisition 428, details of the experiment being performed, a decoder configured to decode data generated for the experiment, etc. This metadata may be stored in a metadata catalog 330. As with the raw data store 424, the metadata catalog 330 may store metadata associated with multiple different acquisition devices in multiple different configurations.

The raw data may be decodable by a set of decoders 404, where each decoder is associated with a particular data type. For example, the decoder may be associated with a particular type of raw data generated by a chromatography instrument in a specific acquisition mode. That instrument may output a stream of raw data, including (e.g.) binary data, arrays of information, etc. The decoder may be programmed to parse a stream of raw data generated by such an instrument so that the data stream can be meaningfully interpreted.

In some embodiments, a single decoder may be associated with multiple data types; in further embodiments, multiple versions of the same decoder may each be associated with different data types. The decoders 404 may be embedded within a data service 402, such as an autonomous service (e.g., via reflection).

Each of the autonomous services may expose one or more endpoint interfaces. A particular decoder may be associated with each endpoint interface. The decoder may be configured to interpret the raw data that is associated with the endpoint interface.

For example, these endpoints may be Representation State Transfer (REST) endpoints capable of receiving RESTful Application Programming Interface (API) calls. An endpoint interface may receive a request for raw data acquired by a chromatography instrument. The data ecosystem 418 may expose multiple endpoint interfaces; for example, each autonomous service may be associated with and may expose at least one endpoint interface. An application 410*a*, 310*c* configured to process the raw data may call into the endpoint interface using an API call in order to retrieve the data.

The autonomous service (or another construct) may retrieve the requested raw data from a raw data store, apply the decoder to the raw data to generate decoded data, and may return the decoded data in response to the original request. For example, the autonomous service may apply the decoder to the raw data and provide decoded data to the requesting application, or the autonomous service may identify the decoder and provide it (or a location at which it can be accessed) to the requesting application along with the raw data (or a location of the raw data). In the latter case, the application may decode the data with the decoder.

Returning to the above described example, the autonomous service may retrieve the sample set models from the sample set model store and/or may retrieve the raw data blobs from the raw data blob store. The data may be decoded according to the decoder, and either version of the data (the raw data blobs or the sample set) may be provided to the application. The reason for supplying either or both of the raw data blobs and the sample set models is that the application may be tuned, for performance reasons, to use one or the other representation of the data.

By exposing the endpoint interfaces in this way, an application 410*a*, 310*c* can request data acquired by a chromatography instrument without needing to understand how to interpret the data. Furthermore, an application 410*a*, 410*c* may deposit the data in a known or common format into a central repository along with metadata indicating, e.g., when the data was received by the application, when the data was processed by the decoder, the identity of user who captured the data, the identity of the instrument that generated the data, and other information describing how and when the data was acquired. Accordingly, when new types of instruments are brought online (potentially outputting data in a different streaming format), it is not necessary to reprogram each application 410*a*, 310*c* that might use that data. Because each application 410*a*, 410*c* need not be programmed with specifics of how to interpret each different type of data stream, more different types of data can be made available to the applications, which allows for more complex analyses. This configuration also allows multiple different types of data to be stored together in a common source structure, simplifying data retrieval and storage.

In the depicted embodiment, the endpoint interfaces are of two types. A first type serves as a catalog endpoint 406, which is configured to receive requests for metadata. In response to receiving a request for metadata on the catalog endpoint 406, the data service 402 may identify the corresponding metadata in the metadata catalog 330. The data service 402 may then either return the requested metadata to the requesting application, or may return the location of the metadata so that it can be retrieved by the application as needed.

Another type of endpoint interface may serve as a data endpoint 408. There are generally a number of data endpoints 408 in the data ecosystem 412 corresponding to a number of data types that the raw data store 424 is capable of supporting. Each data endpoint 408 is characterized by a data type. When an application requests data, it may call into the raw data store or the metadata catalog to identify the type of the data; for example, the data may be tagged with a codec key that is stored with the data and/or in the metadata. The endpoint interfaces may be callable based on the data type, so once the data type is known the requesting application may identify the appropriate endpoint interface to decode the data and may formulate an appropriate RESTful API call to communicate with the interface. This provides an efficient way for the application to identify and call into the autonomous service that is capable of decoding the data.

Consequently, incoming requests are separated into metadata-specific requests and data-specific requests. Each is handled by a different type of endpoint. This helps to segregate incoming requests and provides requesting applications with a known endpoint to target for appropriate types of requests.

In this example, a single autonomous service handles requests for metadata and each different data type. Although straightforward to implement, it may be necessary to update the entire autonomous service every time one of the data types is changed, or a new data type is added. This can cause unnecessary downtime. Furthermore, the autonomous service needs to be capable of accessing both the metadata catalog 330 and the raw data store 424. These issues can be alleviated by dividing responsibility for different tasks between different autonomous services. An example of such an environment is described next in connection with FIG. 4B.

Figure 4B:
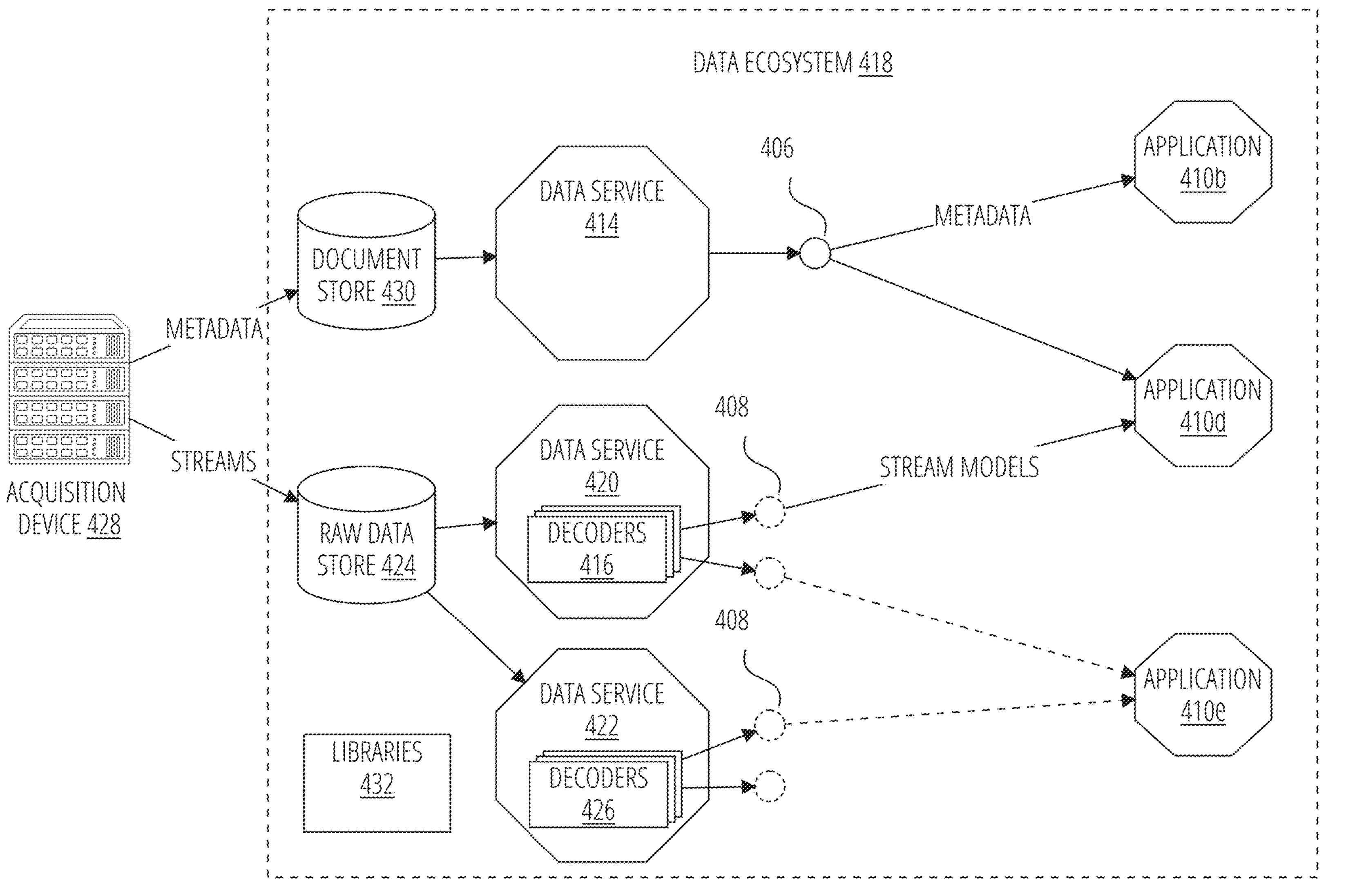
FIG. 4B illustrates a second exemplary data processing ecosystem in accordance with another embodiment.

FIG. 4B illustrates an alternative configuration in which (1) metadata requests are all directed to a particular data service 414, which interfaces with the document store 430 but not the raw data store 424, and (2) data requests are submitted to any of a number of additional autonomous services, each of which has a particular decoder or set of decoders embedded and handles requests specific to the data type of its embedded decoders.

In this configuration, multiple data services 420, 322, etc. service incoming requests for data. Furthermore, at least one data service 414 is specifically configured to respond to requests for metadata. The data service 414 responding to metadata requests does not respond to requests for data, and accordingly does not need to implement any functionality related to the decoders. Similarly, the data services 420, 322, etc. responding to data requests do not need to implement any of the functionality for querying the metadata catalog. When new data types are added, a new autonomous service implementing the decoder for the new data type may be added, or an existing autonomous service may be updated with the new functionality. Meanwhile, most of the autonomous services can remain unchanged. Similarly, if the metadata catalog API is ever changed, only the metadata-handling autonomous service needs to be updated.

The raw data raw data store 424 includes data of multiple different data types. Collectively, the autonomous services may be configured to decode each of the plurality of different data types. For example, the multiple different data types may be included in an interface specification, which may describe how to decode the various different types. The interface specification may be capable of being implemented, at least in part, by each of the autonomous services by implementing corresponding data endpoints 408 and decoders 416, 324. Each data service 420, 322 may be associated with a different set of decoders 416, 324, although there may be some overlap in the decoders supported by different data services. However, no single data service implements all of the decoders, so the functionality for decoding different types of data is distributed across multiple data services. Therefore, different parts of the interface specification may be split between multiple different autonomous services, so that each implements a part, but not all, of the interface specification. Each part of the interface specification may be implemented by at least one of the autonomous services so that, collectively, the group of interface services implements the interface specification.

Because each autonomous service is tasked with only implementing a portion of the interface specification, each autonomous service can be made simpler (since it need not be concerned with providing decoders and endpoint interfaces for portions of the interface specification that it does not implement). New autonomous services can be easily added to deal with new capabilities, and it is not necessary to take down all of the autonomous services when one decoder needs to be updated.

Figure 5:
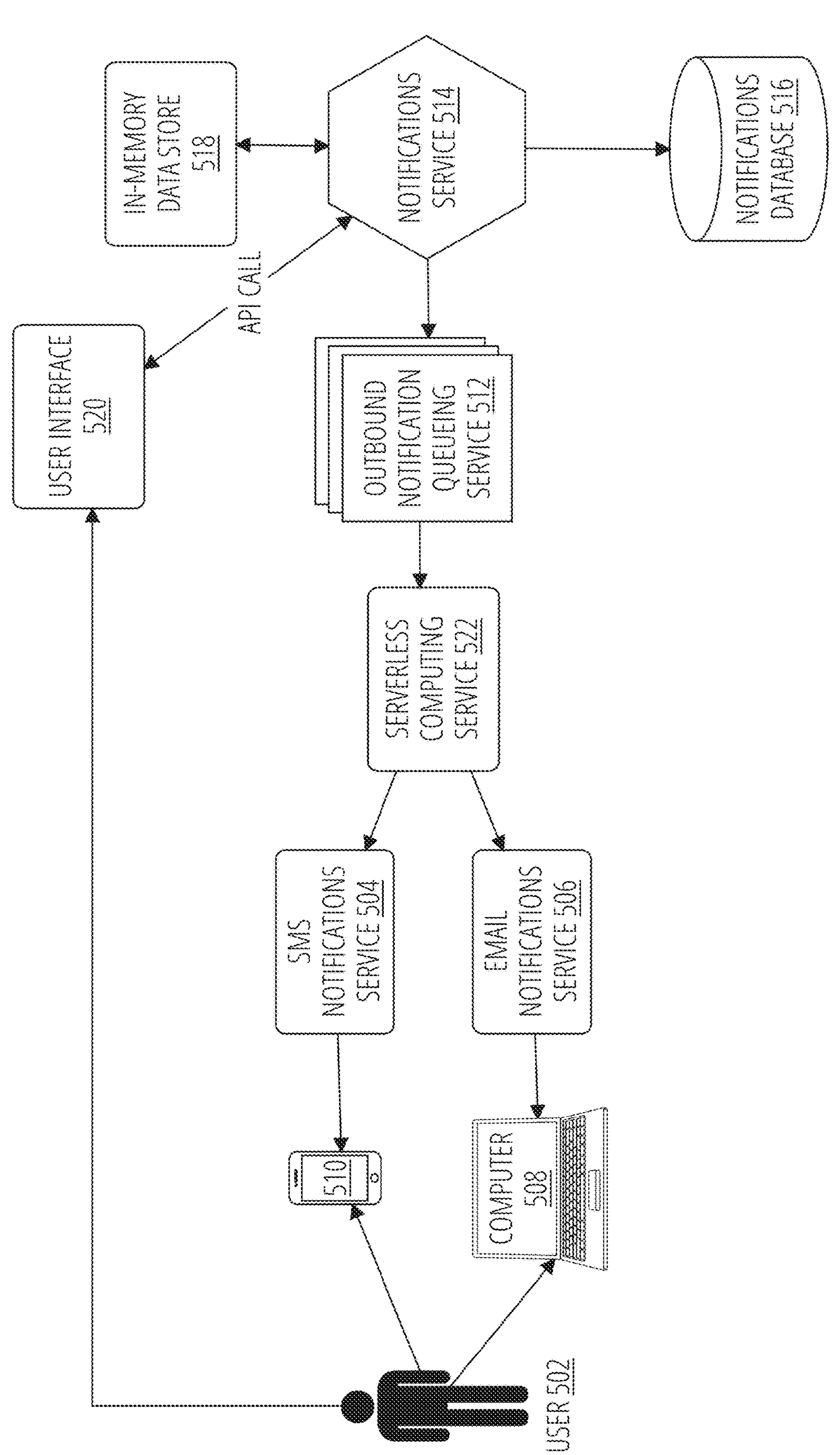
FIG. 5 illustrates an exemplary notifications architecture in accordance with one embodiment.
Figure 6:
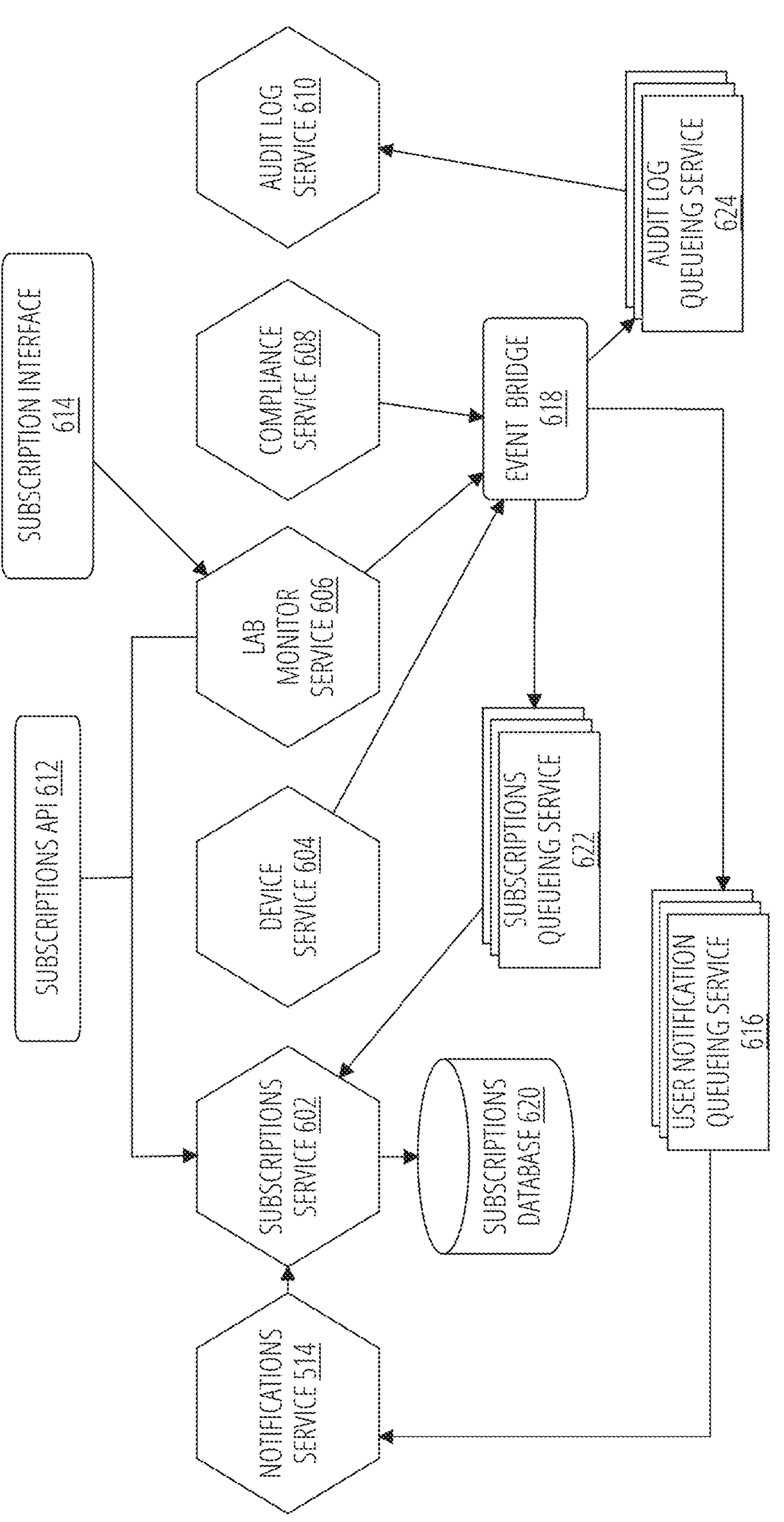
FIG. 6 illustrates an exemplary notifications architecture in accordance with one embodiment.

FIG. 5 and FIG. 6 depict an exemplary architecture suitable for use with exemplary embodiments. Note that FIG. 5 and FIG. 6 refer to a number of services, which may be autonomous services in a cloud computing environment. Nonetheless, embodiments are not limited to this example, and the described services may be implemented by any suitable computing processes.

A user 502 may interact with an analytical chemistry system (which may include one or more laboratory analytical instruments and/or a data ecosystem) using a user interface 520. For instance, the user interface 520 may be displayed on a web page capable of accessing information from the instruments and/or ecosystem, a kiosk connected to the analytical chemistry system, or any other suitable device. The user may also interact with a mobile device 510 and/or computer 508, which may be independent of the analytical chemistry system. The user may additionally interact with any other suitable types of devices that can be registered to receive notifications.

To send notifications to the computer 508, mobile device 510, user interface 520, or other devices, a notifications service 514 may access events stored in a user notification queueing service 616 (see FIG. 6). When an event is added to the user notification queueing service 616, the notifications service 514 may be informed (e.g., by the user notification queueing service 616 pushing the event to the notifications service 514, by the notifications service 514 pulling events periodically from the user notification queueing service 616, by the notifications service 514 establishing a listener that listens for new events added to the user notification queueing service 616, etc.).

The notifications service 514 may identify a type or classification of the event, which may be stored in metadata in the event. The notifications service 514 may search, via a subscriptions service 602 (FIG. 6), for a list of subscribers who have subscribed to receive notifications for events of the type just accessed. The list of subscribers may include individual subscriber identifiers and/or identifiers for teams made up of subscribers. The subscriptions service 602 may look up the members of the teams associated with the subscriptions and return the list of subscribers to the notifications service 514. Optionally, the subscriptions service 602 may identify the distribution channels associated with each of the subscribing users and provide the notifications service 514 with a list of distribution channels to which notifications should be sent (and, optionally, a type of the channel, such as SMS, email, interface notification accessible through an API call, etc.).

The notifications service 514 connects to an in-memory data store 518 that includes notification templates, one for each distribution channel that the 514 is capable of interacting with. For example the in-memory data store 518 may include templates for emails that can be generated for different types of events, SMS templates, interface templates for different types of API calls, etc. An example of an in-memory data store 518 is ELASTICACHE provided by AMAZON WEB SERVICES.

As the notifications service 514 uses the templates to generate notifications from the events received from the user notification queueing service 616, the notifications service 514 may transmit the notifications on the distribution channels identified by the subscriptions service 602. For instance, the notifications service 514 may issue API calls to update the user interface 520. Although only a single user interface 520 is depicted in FIG. 5, it is understood that the user interface 520 may encompass interfaces for more than one application. In some embodiments, active (e.g., foregrounded) and/or inactive (e.g., backgrounded) applications may receive the notifications. A user may receive a notification of an event generated by a first application while the user is interacting with the interface of a second, different application, even if the first application is operating in the background or is not operating on the device that the user is currently interacting with.

The applications having the user interfaces 520 may be a part of the analytical chemistry system (which the notifications service 514 may also be a part of). It may be relatively straightforward for the notifications service 514 to interact with local devices and applications that are part of the analytical chemistry system, since the analytical chemistry system and the local devices/applications may be hosted on the same cloud computing service.

Nonetheless, exemplary embodiments are also capable of interacting with devices and applications outside the scope of the analytical chemistry service (such as the computer 508 and mobile device 510). To that end, the notifications service 514 may add outgoing notifications to an outbound notification queueing service 512. As notifications are received in the outbound notification queueing service 512, a serverless computing service 522 may retrieve the notifications and deliver them to their intended recipients. For instance, when a notification is added to the outbound notification queueing service 512, it may trigger an event that calls into the serverless computing service 522. An example of a suitable serverless computing service 522 is the AWS LAMBDA service provided by AMAZON WEB SERVICES. Through the serverless computing service 522, the notifications service 514 may send push notifications such as Simple Email Service notifications via an email notifications service 506 and/or Simple Message Service notifications via an SMS notifications service 504. An example of an email notifications service 506 is AMAZON SIMPLE EMAIL SERVICE provided by AMAZON WEB SERVICES, and an example of a 504 is AMAZON SIMPLE MESSAGE SERVICE provided by AMAZON WEB SERVICES.

The notifications service 514 may store the notifications and/or information about the notifications in a notifications database 516. For instance, the notifications service 514 may store the read/unread status of each notification (or each notification supporting such status updates) in the notifications database 516. The information in the notifications database 516 may be used to update the status of notifications on the user interface 520 and/or other devices/applications, such as by updating a count of unread notifications, changing the visual state of read notifications, etc.

Status updates for the notifications may be supported by having the notifications service 514 expose a status API that the user interface 520, computer 508, mobile device 510, etc. can call when the notification is read. The different devices may determine the read status of each notification as appropriate to that delivery channel—for instance, an SMS message may be considered to be read when a user opens the conversation including the message; an email may be considered read when the user opens or previews the email, and a notification in the user interface 520 may be considered read when the user interacts with the notifications icon while the notifications icon indicates that there are unread messages. In some cases, a user may be permitted to manually toggle the read/unread status of a notification in a manner appropriate to the delivery channel.

FIG. 6 depicts the portion of the architecture responsible for managing subscriptions and adding event notifications to the user notification queueing service 616.

A subscription interface 614 may receive changes to subscriptions via a dashboard, webpage, or other suitable interface. Users of the analytical chemistry system may be organized into teams (or may be represented as individuals). Teams or individuals may be associated with assigned access rights and permissions, and different teams or individuals may be registered through the subscription interface 614 to receive notifications of different types of events.

The subscription interface 614 may generate an event corresponding to any changes in the subscriptions (e.g., creating a new team, removing a team, adding or removing users from a team, changing a team's permissions, changing the types of events a team or individual is subscribed to receive, etc.). The event may be sent from the subscription interface 614 to a lab monitor service 606 configured to monitor for changes to the subscriptions. The lab monitor service 606 may in turn send the event to an event bridge 618.

The event bridge 618 may be an event bus configured to route events to appropriate services (e.g., based on routing rules). An example of an event bridge 618 suitable for use with exemplary embodiments is AMAZON EVENTBRIDGE by AMAZON WEB SERVICES.

When the event bridge 618 receives a subscription-related event, the changes indicated by the event may be logged in an audit log queueing service 624 for later use by an audit log service 610. The audit log service 610 may be configured to retrieve the events from the audit log queueing service 624 and use the events to build a suitable audit log 334 (see FIG. 3).

Subscription-related events may also cause the event bridge 618 to send a user/team change event to a subscriptions queueing service 622. The subscriptions queueing service 622 may in turn provide the event to the subscriptions service 602, which updates the currently active subscriptions based on the event. The currently active subscriptions may be stored in a subscriptions database 620 that the subscriptions service 602 may consult when the notifications service 514 requests a list of subscribers for a particular notification. The subscriptions database 620 may include a list of subscribers, the types of events that they are subscribed to receive notifications for, and other pertinent subscription-related information. The subscriptions service 602 may query the subscriptions database 620 and display current information about a subscription via a call to a read/query-only subscriptions API 612, which may be accessible via suitable interfaces (e.g., a web page or kiosk associated with the analytical chemistry system).

Similarly, a compliance service 608 may be configured to generate events when user/team assignments are changed. This may change subscription-related information, and these events may be routed in a similar manner to the subscription-related events described above.

Furthermore, one or more device services device service 604 may coordinate interactions with laboratory analytical instruments, data analysis devices, and applications in the analytical chemistry system. When one of these devices meets a predefined condition (e.g., completing a data acquisition, being placed in an error state, generating a warning, completing data processing or a data processing sub-step, receiving a user signoff on a method step or audit record, etc.), the device service 604 may be configured to generate a corresponding event. This event may be directed by the device service 604 to the event bridge 618.

The event bridge 618, upon receiving the event, may generate an audit entry for the audit log queueing service 624. The event bridge 618 may also send the event to the user notification queueing service 616, which triggers the sequence of events described above in connection with FIG. 5.

Figures 7A, 7B:
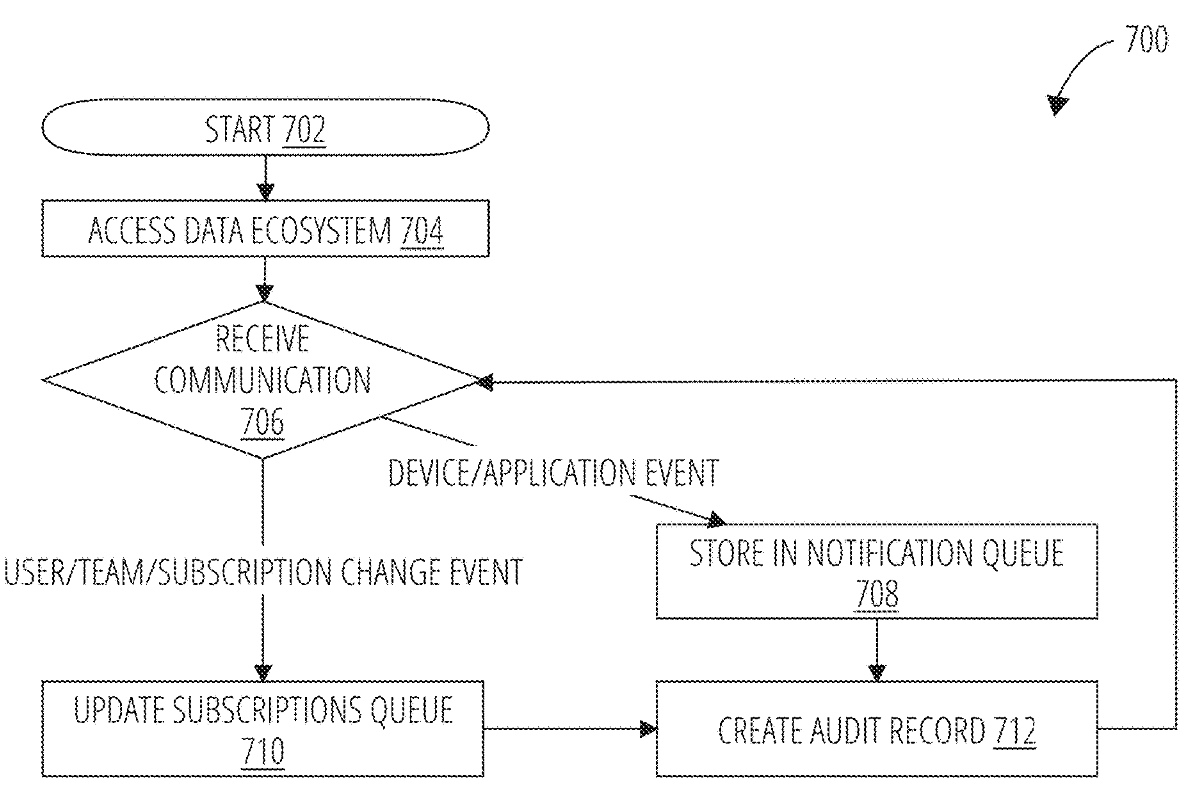
FIG. 7A is a flowchart depicting exemplary notification logic 700 for receiving events by an event bridge in accordance with one embodiment.
FIG. 7B is a flowchart depicting exemplary logic for generating a notification at a notifications service in accordance with one embodiment.

FIG. 7A is a flowchart depicting exemplary notification logic 700 for performing a computer-implemented method according to an exemplary embodiment. The logic may be embodied as instructions stored on a computer-readable medium configured to be executed by a processor. The logic may be implemented by a suitable computing system configured to perform the actions described below. The logic of FIG. 7A may be performed, for example, by the event bridge 618.

Processing begins at start block 702, which may be triggered for example when the event bridge 618 is started up.

In block 704, the event bridge 618 may access a data ecosystem, such as an ecosystem of an analytical chemistry system. For example, the event bridge 618 may advertise its presence to the device service 604, lab monitor service 606, compliance service 608, and other suitable services and processes of the analytical chemistry system. The event bridge 618 may further create or access the subscriptions queueing service 622, user notification queueing service 616, and/or audit log queueing service 624.

In decision block 706, the event bridge 618 may receive a communication in the form of an event. If the event is a device or application event (e.g., an event received from the device service 604), then processing may proceed to block 708 and the event bridge 618 may store the event in a notification queue (such as the user notification queueing service 616). The event may include category information that is added to the event by the device service 604 or determined by the event bridge 618. This category information may be used by the notifications service 514 and/or subscriptions service 602 to determine which subscribers should receive a notification of the event.

In block 712, the event bridge 618 may create an audit record. This may involve, for example, sending the event to the audit log queueing service 624 so that the audit log service 610 can take appropriate actions to add the event to the audit log.

If, at decision block 706, the communication is determined to be a user, team, or subscription change event (e.g., an event received from the lab monitor service 606 or compliance service 608), then processing may proceed to block 710 where the event bridge may update the subscriptions queue. This may involve sending the event to the subscriptions queueing service 622 so that the subscriptions database 620 can take appropriate action as described above. Processing may then proceed to block 712 where the event bridge 618 creates an audit record as already described.

After the audit record is created in block 712, processing may return to decision block 706 where the event bridge 618 awaits the next event from the analytical chemistry system.

Although FIG. 7A depicts particular actions performed in a specific order, embodiments are not limited to the configuration shown in FIG. 7A. It is contemplated that more, fewer, or different logical blocks may be implemented. Similarly, it is contemplated that the actions may be performed in a different order than the one shown in FIG. 7A.

FIG. 7B is a flowchart depicting exemplary notification logic 700 for performing a computer-implemented method according to an exemplary embodiment. The logic may be embodied as instructions stored on a computer-readable medium configured to be executed by a processor. The logic may be implemented by a suitable computing system configured to perform the actions described below. The logic of FIG. 7B may be performed, for example, by the notifications service 514.

Processing may begin at start block 714, which may be performed when the notifications service 514 is initially started. The notifications service 514 may connect to (or create) the user notification queueing service 616, the notifications database 516, the in-memory data store 518, and the outbound notification queueing service 512, among other possibilities.

In block 716, the notifications service 514 may retrieve the next event from the user notification queueing service 616. Based on the event and/or the metadata associated with the event (e.g., the type or category of the event, or the service with which the event originated), the notifications service 514 may determine which subscribers should receive a notification of the event.

To that end, in block 718 the notifications service 514 may get a list of event subscribers. This may be done, for example, by querying the subscriptions service 602 with the event or its type/category. The subscriptions service 602 may consult the subscriptions database 620 and return a subscription identifier, a list of subscribers, and/or a list of delivery channels on which the notifications should be delivered.

Based on the information returned from the subscriptions service 602, in block 720 the notifications service 514 may generate notifications to be delivered on each of the delivery channels associated with the subscriptions. This may involve formatting the notification(s) as appropriate to each type of delivery channel, such as by applying one or more templates retrieved from the in-memory data store 518.

In block 722, the notifications service 514 may transmit the generated notification(s) on the delivery channels associated with the relevant subscription(s). For example, the notifications service 514 may call appropriate user interface 520 APIs and/or leverage an SMS notifications service 504 or email notifications service 506, among other possibilities. Processing may then return to block 716 where the notifications service 514 may await the next event.

Although FIG. 7B depicts particular actions performed in a specific order, embodiments are not limited to the configuration shown in FIG. 7B. It is contemplated that more, fewer, or different logical blocks may be implemented. Similarly, it is contemplated that the actions may be performed in a different order than the one shown in FIG. 7B.

FIG. 8 illustrates one example of a system architecture and data processing device that may be used to implement one or more illustrative aspects described herein in a standalone and/or networked environment. Various network nodes, such as the data server 810, web server 806, computer 804, and laptop 802 may be interconnected via a wide area network 808 (WAN), such as the internet. Other networks may also or alternatively be used, including private intranets, corporate networks, LANs, metropolitan area networks (MANs) wireless networks, personal networks (PANs), and the like. Network 808 is for illustration purposes and may be replaced with fewer or additional computer networks. A local area network (LAN) may have one or more of any known LAN topology and may use one or more of a variety of different protocols, such as ethernet. Devices data server 810, web server 806, computer 804, laptop 802 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 810, web server 806, and client computer 804, laptop 802. Data server 810 provides overall access, control and administration of databases and control software for performing one or more illustrative aspects described herein. Data server 810 may be connected to web server 806 through which users interact with and obtain data as requested. Alternatively, data server 810 may act as a web server itself and be directly connected to the internet. Data server 810 may be connected to web server 806 through the network 808 (e.g., the internet), via direct or indirect connection, or via some other network. Users may interact with the data server 810 using remote computer 804, laptop 802, e.g., using a web browser to connect to the data server 810 via one or more externally exposed web sites hosted by web server 806. Client computer 804, laptop 802 may be used in concert with data server 810 to access data stored therein, or may be used for other purposes. For example, from client computer 804, a user may access web server 806 using an internet browser, as is known in the art, or by executing a software application that communicates with web server 806 and/or data server 810 over a computer network (such as the internet).

Servers and applications may be combined on the same physical machines, and retain separate virtual or logical addresses, or may reside on separate physical machines. FIG. 8 illustrates just one example of a network architecture that may be used, and those of skill in the art will appreciate that the specific network architecture and data processing devices used may vary, and are secondary to the functionality that they provide, as further described herein. For example, services provided by web server 806 and data server 810 may be combined on a single server.

Each component data server 810, web server 806, computer 804, laptop 802 may be any type of known computer, server, or data processing device. Data server 810, e.g., may include a processor 812 controlling overall operation of the data server 810. Data server 810 may further include RAM 816, ROM 818, network interface 814, input/output interfaces 820 (e.g., keyboard, mouse, display, printer, etc.), and memory 822. Input/output interfaces 820 may include a variety of interface units and drives for reading, writing, displaying, and/or printing data or files. Memory 822 may further store operating system software 824 for controlling overall operation of the data server 810, control logic 826 for instructing data server 810 to perform aspects described herein, and other application software 828 providing secondary, support, and/or other functionality which may or may not be used in conjunction with aspects described herein. The control logic may also be referred to herein as the data server software control logic 826. Functionality of the data server software may refer to operations or decisions made automatically based on rules coded into the control logic, made manually by a user providing input into the system, and/or a combination of automatic processing based on user input (e.g., queries, data updates, etc.).

Memory 1222 (deleted) may also store data used in performance of one or more aspects described herein, including a first database 832 and a second database 830. In some embodiments, the first database may include the second database (e.g., as a separate table, report, etc.). That is, the information can be stored in a single database, or separated into different logical, virtual, or physical databases, depending on system design. Web server 806, computer 804, laptop 802 may have similar or different architecture as described with respect to data server 810. Those of skill in the art will appreciate that the functionality of data server 810 (or web server 806, computer 804, laptop 802) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
accessing a data ecosystem for an analytical chemistry system;
receiving, at an event bridge in the data ecosystem, an event from an application connected to the data ecosystem;
generating a notification of the event; and
transmitting the notification across a plurality of different delivery channels to a user who has subscribed to receive a notification of the event,
wherein a notification service retrieves a copy of the event from a notifications queue in communication with the event bridge, transforms the event into the notification, and transmits the notification on the plurality of channels.

2. The computer-implemented method of claim 1, wherein the event is one or more of: a new audit log entry, a completion of an asynchronous operation, an error or a warning associated with the asynchronous operation, an acquisition event, a file upload, a file conversion, or a workflow-related operation.

3. The computer-implemented method of claim 1, wherein the plurality of different channels comprise at least two of: a simple messaging service channel, an email channel, a web browser channel, and an application programming interface (API) channel.

4. The computer-implemented method of claim 1, wherein the application is a first application and the event is received at a time that a second application different from the first application is active.

5. The computer-implemented method of claim 1, wherein the event bridge is in communication with one or more of:
a device service configured to generate events describing a state of a laboratory analytical instrument in the analytical chemistry system;

a laboratory monitoring service configured to generate events in response to a creation, editing, or removal of a subscription in the data ecosystem; or a compliance service configured to generate events in response to a change in an assignment of a user of the data ecosystem to a team, or the assignment of one or more rights to the team.

6. The computer-implemented method of claim 1, further comprising adding an entry corresponding to the event to an audit log maintained by the data ecosystem.

7. A non-transitory computer-readable storage medium, the computer-readable storage medium including instructions that when executed by a computer, cause the computer to:

access a data ecosystem for an analytical chemistry system;

receive, at an event bridge in the data ecosystem, an event from an application connected to the data ecosystem;

generate a notification of the event; and transmit the notification across a plurality of different delivery channels to a user who has subscribed to receive a notification of the event, wherein a notification service retrieves a copy of the event from a notifications queue in communication with the event bridge, transforms the event into the notification, and transmits the notification on the plurality of channels.

8. The computer-readable storage medium of claim 7, wherein the event is one or more of: a new audit log entry, a completion of an asynchronous operation, an error or a warning associated with the asynchronous operation, an acquisition event, a file upload, a file conversion, or a workflow-related operation.

9. The computer-readable storage medium of claim 7, wherein the plurality of different channels comprise at least two of: a simple messaging service channel, an email channel, a web browser channel, and an application program interface (API) channel.

10. The computer-readable storage medium of claim 7, wherein the application is a first application and the event is received at a time that a second application different from the first application is active.

11. The computer-readable storage medium of claim 7, wherein the event bridge is in communication with one or more of:

a device service configured to generate events describe a state of a laboratory analytical instrument in the analytical chemistry system;

a laboratory monitor service configured to generate events in response to a creation, editing, or removal of a subscription in the data ecosystem; or a compliance service configured to generate events in response to a change in an assignment of a user of the data ecosystem to a team, or the assignment of one or more rights to the team.

12. The computer-readable storage medium of claim 7, wherein the instructions further configure the computer to add an entry corresponding to the event to an audit log maintained by the data ecosystem.

13. A computing apparatus comprising:

a processor; and a memory storing instructions that, when executed by the processor, configure the apparatus to:

access a data ecosystem for an analytical chemistry system;

receive, at an event bridge in the data ecosystem, an event from an application connected to the data ecosystem;

generate a notification of the event; and transmit the notification across a plurality of different delivery channels to a user who has subscribed to receive a notification of the event, wherein a notification service retrieves a copy of the event from a notifications queue in communication with the event bridge, transforms the event into the notification, and transmits the notification on the plurality of channels.

14. The computing apparatus of claim 13, wherein the event is one or more of: a new audit log entry, a completion of an asynchronous operation, an error or a warning associated with the asynchronous operation, an acquisition event, a file upload, a file conversion, or a workflow-related operation.

15. The computing apparatus of claim 13, wherein the plurality of different channels comprise at least two of: a simple messaging service channel, an email channel, a web browser channel, and an application program interface (API) channel.

16. The computing apparatus of claim 13, wherein the application is a first application and the event is received at a time that a second application different from the first application is active.

17. The computing apparatus of claim 13, wherein the event bridge is in communication with one or more of:

a device service configured to generate events describe a state of a laboratory analytical instrument in the analytical chemistry system;

a laboratory monitor service configured to generate events in response to a creation, editing, or removal of a subscription in the data ecosystem; or a compliance service configured to generate events in response to a change in an assignment of a user of the data ecosystem to a team, or the assignment of one or more rights to the team.

* * * * *